Aug. 21, 1928.　　　　　　　　　　　　　　　　1,681,352
E. H. LICHTENBERG
EASILY OPERATED CLUTCH
Filed June 12, 1925　　　　2 Sheets-Sheet 1
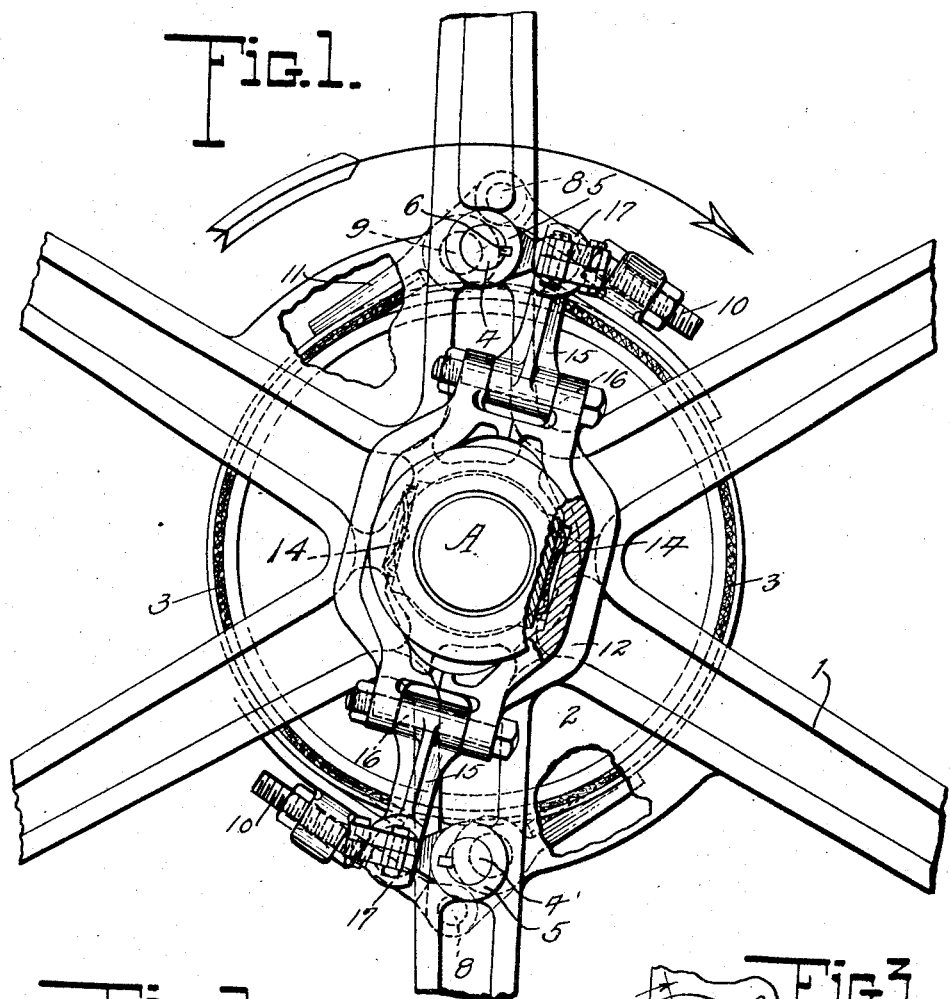
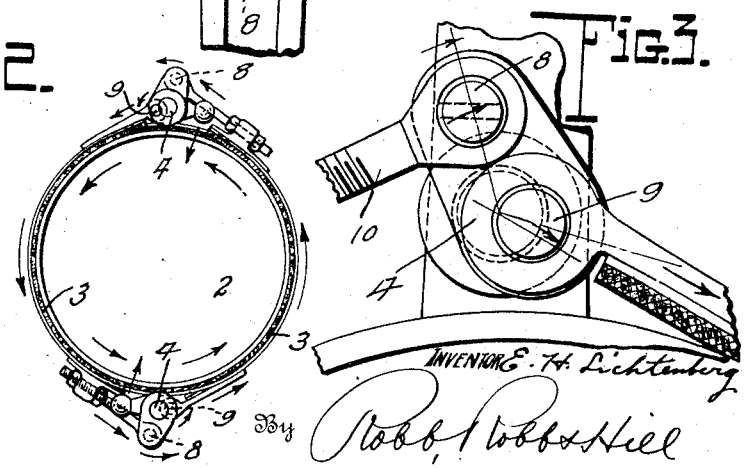

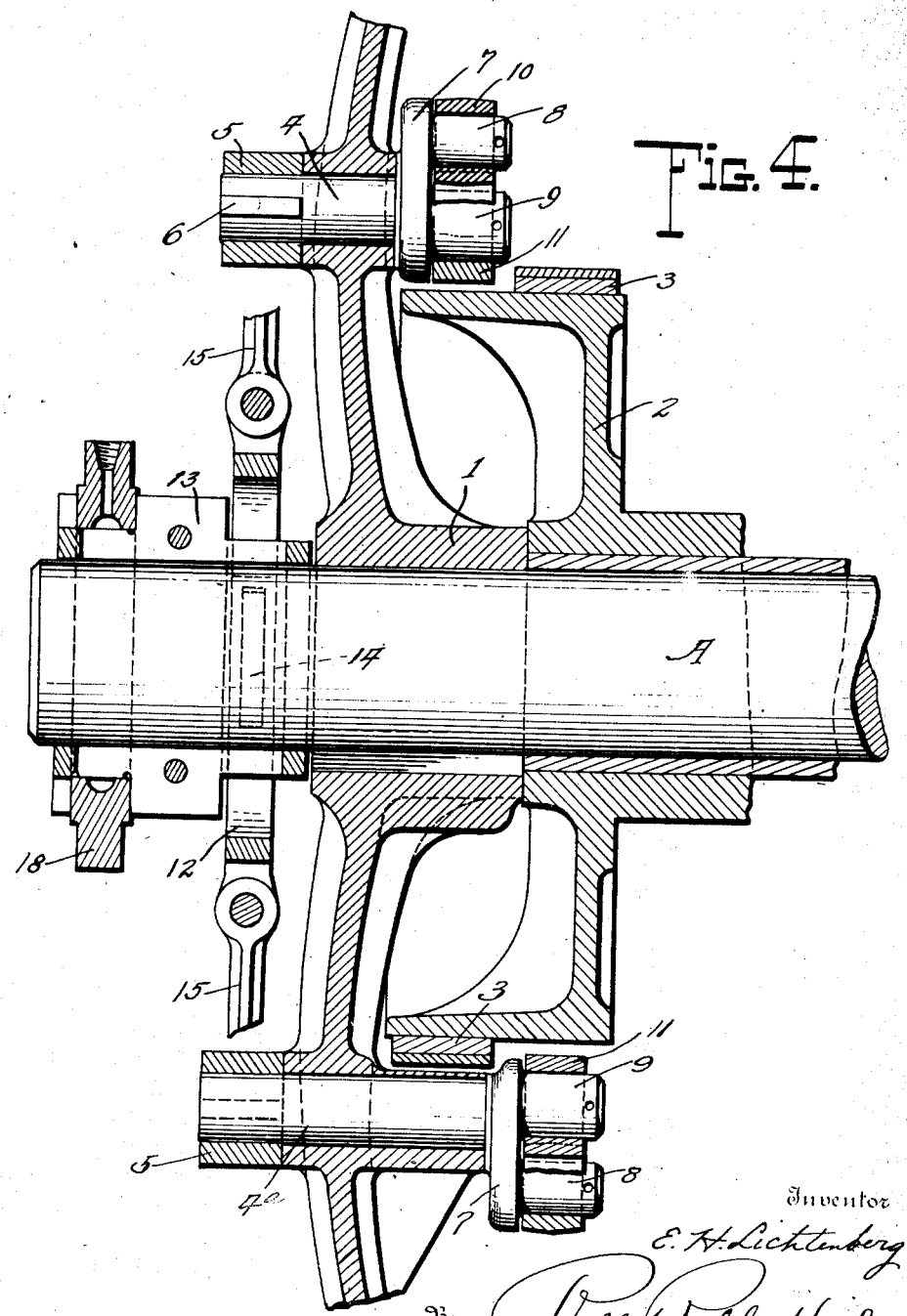

Patented Aug. 21, 1928.

1,681,352

UNITED STATES PATENT OFFICE.

ERICH H. LICHTENBERG, OF MILWAUKEE, WISCONSIN, ASSIGNOR TO KOEHRING COMPANY, OF MILWAUKEE, WISCONSIN, A CORPORATION.

EASILY-OPERATED CLUTCH.

Application filed June 12, 1925. Serial No. 36,742.

The aim of the present invention has been to produce a comparatively simple design of clutch of the band type wherein by the expenditure of a slight amount of power, the clutch means may be caused to be applied so as to produce a maximum gripping effect of the clutch band device.

In the carrying out of the invention there is employed a lever device having eccentric connections with the opposite ends of a clutch band and operable to turn on its axis to rock certain eccentric studs or pins attached to the opposite ends of the clutch band, whereby the clutch band so grips the associated clutch drum or member that a load is set up in the dead end of the clutch band, insuring in conjunction with the action of the live end of the clutch band, such a complete gripping effect as to afford a maximum clutching effort on the part of the band. In fact the action of the dead end of the clutch band under such conditions is such that it cooperates with the clutch drum or member to assist in the setting of the clutch means for active cooperation between the relatively movable clutch part, which is a gear in the present case, and the relatively stationary part which is the drum.

By the use of the invention therefore, a comparatively light pressure upon an operating or controlling lever governing the action of the clutch band will through the manipulation of the lever and the effective cooperation of the load upon which the band acts, be sufficient to effectively apply the clutch.

Still another feature of this invention resides in the provision of double clutch means in that there are utilized a pair of clutch bands operating upon the clutch drum or normally relatively stationary member, special provisions being made whereby these bands are operatively disposed and are actuated by means of a common control member involving a shifting yoke or lever device and a cooperating equalizing contrivance whereby said clutch bands are caused to act with equal clutching effects upon the drum or relatively stationary member. The equalizing contrivance inherently involves the use of a floating actuating part and certain provisions of a novel nature are made to prevent looseness of said part that might result in rattling or unnecessary shifting thereof during the rotation of the clutch bands with the part upon which they are mounted.

In the accompanying drawings,

Figure 1 is a side view of a preferred embodiment of the invention, the arrow indicating the direction of turning of the relatively movable clutch member.

Figure 2 is a diagrammatic view illustrative of the eccentricity of the connections between the actuating rocker shafts and the ends of the clutch bands, the arrows denoting the direction of the stresses or resistance set up in the clutch bands in the application of the same for communicating motion from the moving member to the relatively stationary member.

Figure 3 is an enlarged view bringing out more clearly the method of connecting the live and dead ends of the clutch bands to the rocker member or actuator therefor.

Figure 4 is a sectional view through the relatively movable and stationary clutch members bringing out more clearly the arrangement of the clutch bands in different planes and the operating connections between the actuating rocker shafts and the ends of said bands.

In the drawings A designates a shaft of any usual class to which is keyed the relatively movable clutch member 1, which may be a wheel, gear, or the like, driven from a suitable power plant. The said movable clutch member 1 is arranged adjacent to the relatively stationary clutch member 2 which may consist of a drum or similar device connected up with a mechanism intended to be driven at intervals by the application of the clutch means carried by the clutch member 1. The clutch means on the clutch member 1 comprises preferably two clutch bands 3 arranged side by side so as to extend about the clutch member 2 for engagement with the latter. The forms of the clutch bands 3 are the same, and each of them is actuated by the same kind of device in order to cause the same to be applied to the drum 2 with clutching effect. For this reason one of the means used to control the operation of one of the clutch bands 3 will be described in detail, but will be understood to be the same as used for both bands. Suitably journaled on the movable clutch member 1, as for instance by means of a bearing in a spoke of the same, is an actuating rocker shaft 4, on the outer end of which is mounted a rocker lever 5 for imparting to said shaft a slight turning movement. The lever 5 is mounted at one side of the spoke in which the shaft 4 is journaled and then is keyed to the shaft by the key 6 or equivalent means. At the opposite side of said spoke of the member 1 and carried by the opposite end of the shaft 4 is the arm 7. The arm 7 carries offstanding pins or studs 8 and 9 which are disposed eccentrically to the shaft 4. The pin 8 is attached by any suitable adjustable bolt means 10 to the live end of the clutch band 3, and the pin or stud 9 is secured to the dead end of this clutch band by the usual coupling member 11 used in means of this class.

Assuming that there has been above described the operating means for the clutch band 3 nearest to the member 1, it remains necessary to simply state that the said means is duplicated for use in connection with the other clutch band 3, and shown at the bottom of Figure 4, with the single exception that the shaft 4ᵃ used is a slightly longer shaft and the bearing in the adjacent spoke of the clutch member 1 is also elongated to correspond with the length of said shaft, in order that the shaft 4ᵃ may readily cooperate with the clutch band 3 more remotely situated from the member 1 and encircling the drum 2. It is notable that the outermost pin or stud 8 and the innermost pin or stud 9 are disposed approximately on opposite sides of the shaft or axis 4, though not exactly so. Furthermore, it is clear that by an outward movement of the lever 5, a rocking movement will be imparted to the rocker arm 7, shifting the members 8 and 9 about an axis 4 in such a manner as to cause gripping of the drum 2 by the clutch band with which said parts are connected, a very slight rotation of the shaft 4 being sufficient to cause the application of the clutch band in such a way that a load set up in the dead end of the band enabling the use of the resistance load as a means for facilitating the application of the clutch means 3 with a maximum amount of effective clutching action with the expenditure of a relatively small degree of power.

In order that both of the clutch bands 3 may be applied with equalizing force from the main actuating lever or handle operated for the purpose of applying the clutch means to the drum 2, there is employed a floating equalizing member 12 which encircles the supporting shaft A for the clutch members 1 and 2. This equalizing member 12 has interposed between it and the shifter collar 13 springs 14 at opposite sides of the collar. The purpose of these springs is to create sufficient friction between the member 12 and the collar 13 to prevent the equalizing member 12 from oscillating or loose shifting movement relatively to the part 13 when the clutch bands 3 are not applied to the drum 2. Obviously, during each revolution of the member 1, when the clutch means is not in use, the member 12 would have a tendency to drop resulting in a rattle and looseness and wear of the parts undesirable in a mechanism of this sort for obvious reasons. The equalizing member 12 has a connection with each of the levers 5 by means of links 15 at opposite ends of said member 12, the links being pivoted at 16 to the part 12 at the inner ends of the links, and the outer ends of the links being equipped with sectional socket heads 17 to receive a round or ball-shaped extremity of the levers 5 for establishing a suitable pivotal connection between the several parts.

Any suitable means may be employed for operating the shifter collar 13, as for instance, the yoke 18 of a suitable lever directly or indirectly controlled by hand, this being immaterial to the invention.

From the foregoing it will be observed that by the use of a very much simplified arrangement of actuating parts 4, 5, 8 and 9 effective application of clutch bands 3 to the clutch member 2 in order to cause the latter to rotate with the member 1, is secured.

Special reference is made to Figure 2 for the action of the clutch instrumentalities. In this figure it may be assumed that the clutch member 1 is turning in a clockwise direction. Upon the application of the clutch band, the ends of which are disposed at the upper portion of the drum, it is evident that there will be produced resistance acting in the direction of the arrows. The resistance forces thus set up have a tendency to pull down on the left end of the band referred to, thus tending to carry the connecting stud 9 in a contra-clockwise direction relative to its axis, and clockwise relative to the drum. The effect of the resistance on the opposite or live end of the band is to carry the connecting stud 8 in the same direction as that in which the stud 9 moves, in relation to the axis. Under these conditions the tendency of the points 4, 8 and 9 is to cause overlap of the band ends and thus automatically effect clutching, so that practically no physical effort on the part of the operator is required to throw the pin or stud 8 over, and cause the opposite movement of the pin or stud 9 to carry the latter under the axis 4.

Having thus described my invention what I claim as new and desire to secure by Letters Patent is:

1. In clutch means of the class described, in combination, a relatively movable clutch member, a relatively stationary clutch member, a pair of clutch bands surrounding the relatively stationary member, the ends of one clutch band being opposite the ends of the other clutch band, a floating equalizing member arranged to turn with the movable clutch member, equalizing connections between said movable clutch member and the opposite ends of the said clutch bands, a clutch shifting collar for the equalizing member to cause operation of its equalizing connections for applying the bands to the stationary clutch member and yieldable means to prevent relative movement of the equalizing member and the shifting collar therefor, except as required and incidental to its equalizing function.

2. In a clutch means of the class described, in combination, a stationary clutch member, a pair of clutch bands surrounding said member and each having its ends adjacent to one another, the adjacent ends of one clutch band being located on the clutch member opposite those of the other band, tightening means to cause gripping of the clutch bands arranged so as to connect the ends of the clutch bands together, means for actuating said tightening means consisting of an equalizing member and a link between each tightening means and said equalizing member, a movable clutch member carrying said tightening means, a shaft on which said clutch members are carried, a shifting collar mounted on said shaft and engaging the equalizing member for actuation thereof, and means intermediate the shifting collar and equalizing member for preventing relative movement of these parts other than incident to the equalizing action of the equalizing member in relation to the tightening means for the two clutch bands, the said intermediate means consisting of friction springs interposed between the equalizing member and said shifting collar.

3. In clutch means of the class described, in combination, relatively movable and stationary clutch members, a clutch band cooperating with the stationary clutch member and having its ends adjacent to one another, and means on the relatively movable clutch member for causing application of said clutch band to the stationary clutch member comprising a shaft, means for rocking said shaft, a rocker arm carried by said shaft, a pair of studs projecting from said rocker arm and each joined to one end of the clutch band, said studs being arranged ecentrically to the said shaft and at different distances from the center thereof, the stud nearer the center being disposed at a point out of a plane tangent to the stationary clutch member and passing through the axis of the said shaft, so as to have appreciable movement inwardly toward the axis of the stationary clutch member automatically under the influence of the frictional drag of the stationary clutch member.

4. In clutch means of the class set forth, in combination, cooperating clutch members, a clutch band encircling one of said clutch members, a rocker shaft carried by the other clutch member and having an integral arm equipped with spaced offstanding studs one of which is disposed eccentrically to the axis of said shaft, the said studs being connected with the opposite ends of the clutch band and one of the studs being of the clutch member with which adjacent to the clutch member with which the clutch band coacts and the other stud disposed more remotely from said clutch member than that just referred to, and means to cause relative travel of the ends of the clutch band in the same circumferential direction to effect tightening of the clutch band upon its coacting clutch member, the stud aforesaid adjacent the clutch member having its axis arranged in a plane forming an acute angle with a plane passing through the shaft axis and tangent to the said coacting clutch member, whereby the frictional drag will cause further clutch action.

5. In clutch means of the class described, in combination, relatively movable and stationary clutch members, a pair of clutch bands cooperating with the stationary clutch member and each having its ends arranged so that one is near the stationary clutch member and the other is somewhat spaced from and more remote in respect to said stationary clutch member, the ends of the respective bands being disposed at opposite sides of the stationary clutch member, and rocker means intermediate the two ends of each clutch band and connected therewith for shifting said ends to apply the band, the points where said rocker means are connected with the dead ends of the clutch bands being located to one side of the tangent line of pull when clutching action is applied so that the resistance set up by the stationary clutch member on application of the clutch bands thereto, tends to produce an increase in the clutch action, thereby reducing materially the physical effort necessary to operate the said clutch bands.

In testimony whereof I affix my signature.

ERICH H. LICHTENBERG.